(12) United States Patent
Oh et al.

(10) Patent No.: US 6,702,868 B2
(45) Date of Patent: Mar. 9, 2004

(54) GRILL ASSEMBLY OF A CYCLONE DUST-COLLECTING APPARATUS FOR A VACUUM CLEANER

(75) Inventors: Jang-keun Oh, Gwangju (KR); Jung-seon Park, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 10/080,418

(22) Filed: Feb. 22, 2002

(65) Prior Publication Data

US 2002/0178697 A1 Dec. 5, 2002

(30) Foreign Application Priority Data

Jun. 1, 2001 (KR) .......................... 2001-30743

(51) Int. Cl.⁷ .............................................. B01D 45/00
(52) U.S. Cl. ..................................................... 55/413
(58) Field of Search ........................ 55/424, 426, 413, 55/459.1, DIG. 3; 15/350, 353

(56) References Cited

U.S. PATENT DOCUMENTS

| 964,428 | A | * | 7/1910 | Johnson et al. ............... 55/415 |
| 2,071,975 | A | * | 2/1937 | Holm-Hansen et al. ........ 55/413 |
| 6,195,835 | B1 |  | 3/2001 | Song et al. |

FOREIGN PATENT DOCUMENTS

| DE | 9945403 | 6/2000 |
| DE | 9938769 | 3/2001 |
| GB | 2330786 | 5/1999 |
| JP | 11290724 | 10/1999 |
| SU | 1011272 | 4/1983 |
| SU | 1524931 | 11/1989 |
| WO | WO9922872 | 5/1999 |
| WO | WO9922873 | 5/1999 |
| WO | WO9922874 | 5/1999 |

* cited by examiner

Primary Examiner—Robert A. Hopkins
(74) Attorney, Agent, or Firm—Ladas & Parry

(57) ABSTRACT

A grill assembly of a cyclone dust-collecting apparatus for a vacuum cleaner may improve the capability of dust-collecting of the vacuum cleaner by reducing the amount of the filth drawn into a vacuum-generating device of the vacuum cleaner through a grill. The grill assembly may be disposed at an inlet of an air-discharging passage of a cyclone body that separates filth from a whirling air current by centrifugal force. The whirling air current may prevent the filth from being drawn into the vacuum-generating device of the vacuum cleaner. The grill assembly may include a grill body and a plurality of passages disposed therein. An extended line of the centerline of the passages may form an acute angle with a streamline of the whirling air current.

10 Claims, 5 Drawing Sheets to a cyclone body. The cyclone body separates filth from a whirling air current by centrifugal force. The whirling air current may prevent filth from being drawn into the vacuum-generating device of the vacuum cleaner. The cyclone body may include a grill body and a plurality of passages formed therein. An extended centerline of the passages forms an acute angle with a streamline of the whirling air current.

GRILL ASSEMBLY OF A CYCLONE DUST-COLLECTING APPARATUS FOR A VACUUM CLEANER

BACKGROUND OF THE INVENTION

1. Field of the Invention

The present invention relates to a cyclone dust-collecting apparatus for a vacuum cleaner, and more particularly to a grill assembly of a cyclone dust-collecting apparatus for a vacuum cleaner capable of preventing backflow of filth into a vacuum-generating device.

2. Description of the Related Art

FIG. 1 shows one example of a conventional cyclone dust-collecting apparatus for a vacuum cleaner. According to FIG. 1, conventional cyclone dust-collecting apparatus 10 for a vacuum cleaner includes cyclone body 20, filth-collecting portion 30, and partition 40.

Air-suction passage 21, connected to a brush assembly (not shown) of the vacuum cleaner, is disposed at the upper part of cyclone body 20. Air is drawn in through air-suction passage 21. The air forms a whirling air current while being drawn in a tangential direction to cyclone body 20.

Air-discharging passage 22, connected to a vacuum-generating device (not shown) of a vacuum cleaner, is disposed at the upper center of cyclone body 20. Grill 23 is disposed at the inlet of air-discharging passage 22 to prevent filth, e.g. hair, from being drawn to the vacuum-generating device.

As shown in FIG. 2, a plurality of passages 24 are formed through grill 23 for cleaned air to be drawn to the vacuum-generating device. The reference character A designates a streamline of a whirling air current of cyclone body 20.

For conventional cyclone dust-collecting apparatus 10 for a vacuum cleaner with the construction above, when the vacuum-generating device of the vacuum cleaner is operated, the air containing filth from a cleaning surface is drawn to cyclone body 20 through air-suction passage 21.

The air drawn into cyclone body 20 forms a whirling air current and filth in the air is collected in filth-collecting portion 30 by being separated by centrifugal force of the whirling air current. The cleaned air is transferred to the vacuum-generating device through passages 24 of grill 23 and air-discharging passage 22.

On the other hand, filth, which has not been separated from the air current, passes through grill 23 with the air through passages 24. The filth in the air flows through air-discharging passage 22 to the vacuum-generating device with a filter (not shown) at the upper part therein.

The filth is separated and filtered from the air in the filter, and the cleaned air is discharged to the vacuum cleaner through the vacuum-generating device. The filth clogs passage holes of the filter, thus the dust-collecting capability of the vacuum cleaner is decreased.

SUMMARY OF THE INVENTION

An embodiment provides a grill assembly of a cyclone dust-collecting apparatus for a vacuum cleaner capable of improving the dust-collecting capability of the vacuum cleaner. The grill assembly may improve the dust-collecting capability by reducing the amount of filth drawn to a vacuum-generating device through the grill.

The grill assembly of the cyclone dust-collecting apparatus for the vacuum cleaner may be disposed at an inlet of an air-discharging passage of a cyclone body. The cyclone body separates filth from a whirling air current by centrifugal force. The whirling air current may prevent filth from being drawn into the vacuum-generating device of the vacuum cleaner. The cyclone body may include a grill body and a plurality of passages formed therein. An extended centerline of the passages forms an acute angle with a streamline of the whirling air current.

A separate shielding member, removably connected to the grill body, may shield an end of an upper part of the grill body. The shielding member may also convert an advancing direction of the filth in the air transferred to the grill body to the whirling air current.

In another embodiment, the grill assembly may include a plurality of blades disposed a predetermined distance apart such that the air may be transferred along an outer circumference of the grill body. A centerline of the blades forms an acute angle with a streamline of the whirling air current.

The predetermined distance between the blades and the angle between the blades and the streamline of the whirling air current may be determined such that there is about 10% to about 50% of overlapping shade between adjacent blades when the blades are projected onto an imaginary cylinder coaxial with the blades.

BRIEF DESCRIPTION OF THE DRAWINGS

Further advantages of the present invention will become apparent to those skilled in the art with the benefit of the following detailed description of embodiments and upon reference to the accompanying drawings in which.

Figure 1:
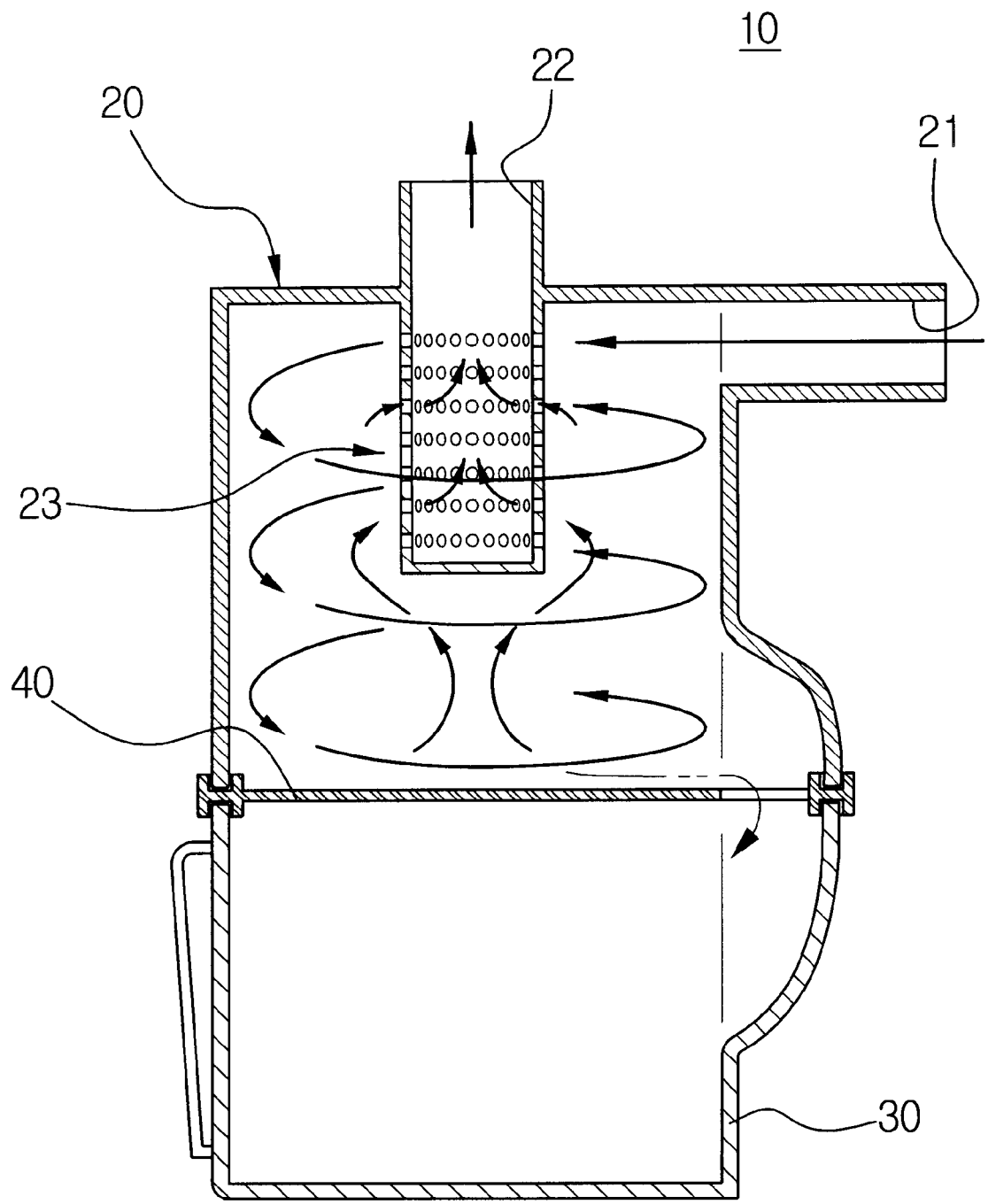
FIG. 1 is a sectional view showing a conventional cyclone dust-collecting apparatus of a vacuum cleaner.
Figure 2:
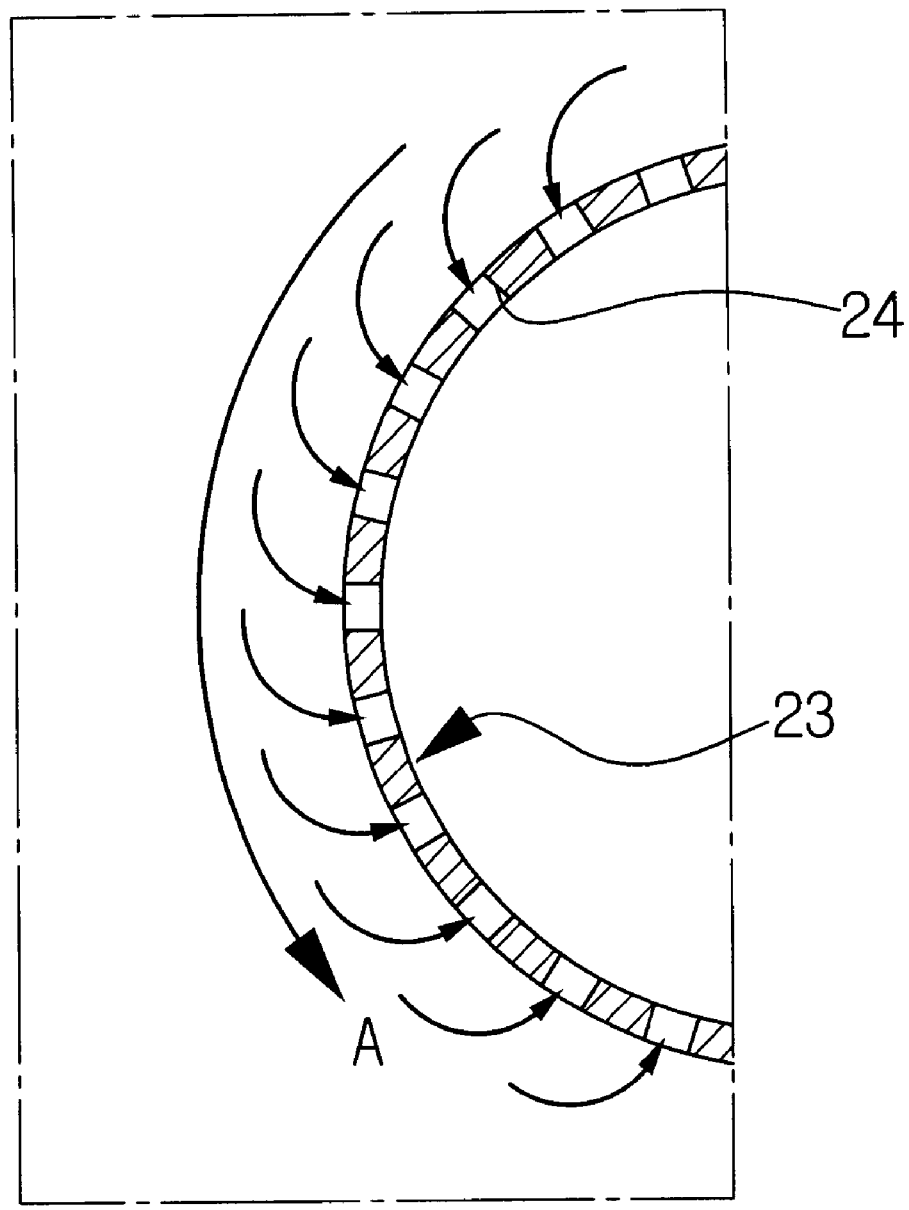
FIG. 2 is a partial sectional view illustrating the flow of the air around the grill of the cyclone dust-collecting apparatus of the vacuum cleaner of FIG. 1.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 3:
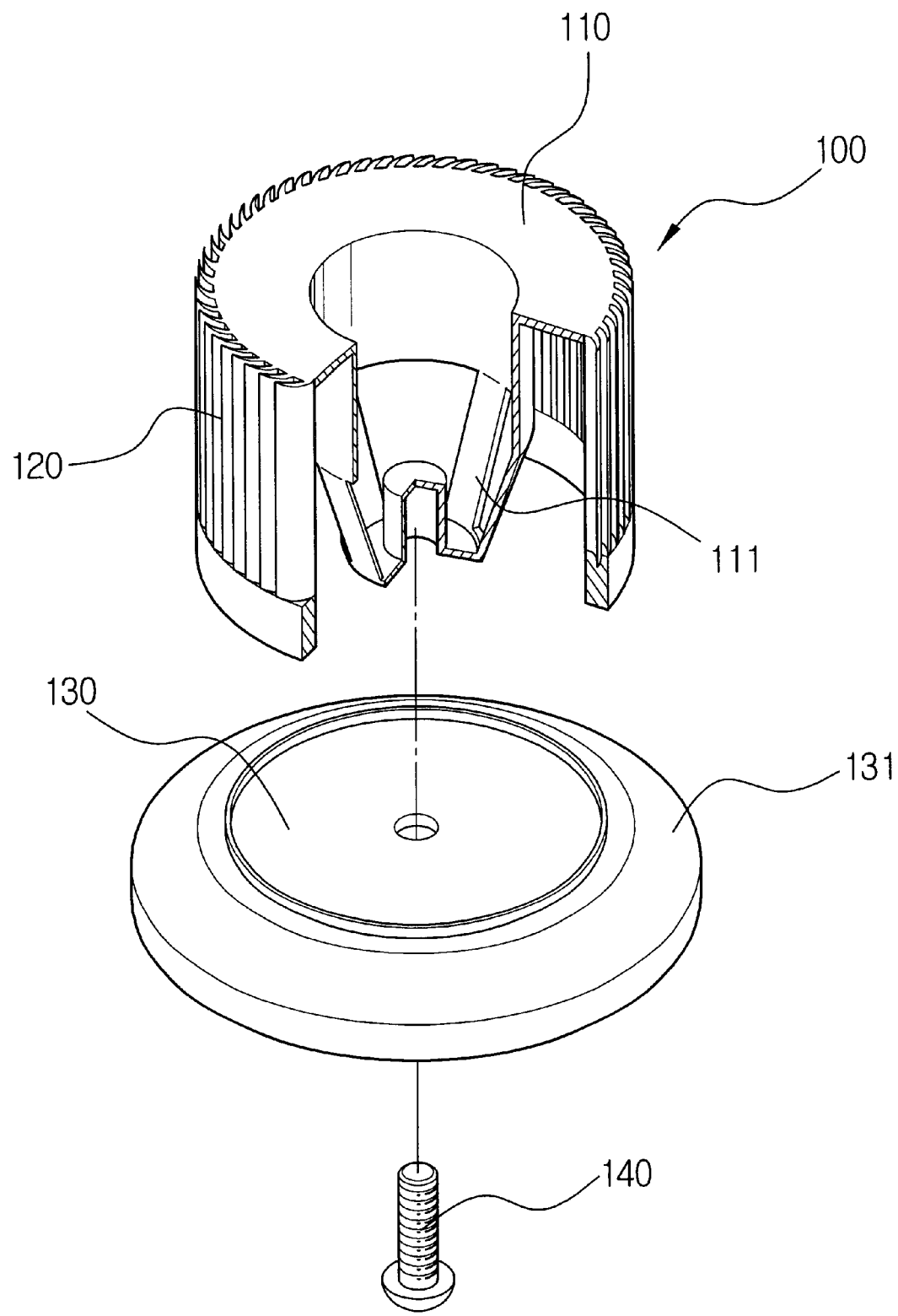
FIG. 3 is an exploded perspective view of an embodiment showing a grill assembly of a cyclone dust-collecting apparatus.

FIG. 3 shows an embodiment of a grill assembly of a cyclone dust-collecting apparatus for a vacuum cleaner. Grill assembly 100 may include grill body 110, a plurality of blades 120, and shielding member 130.

Figure 4:
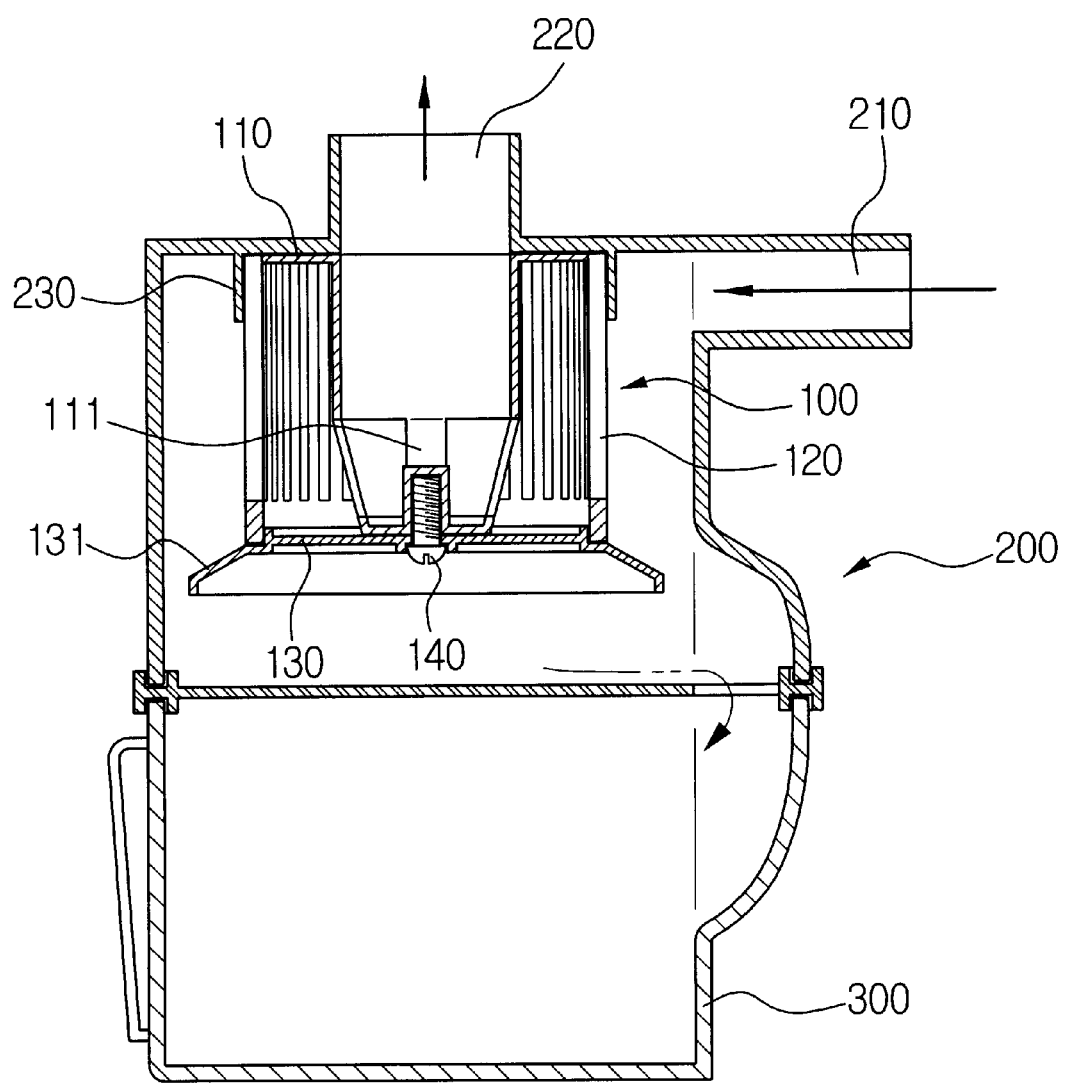
FIG. 4 is a sectional view of an embodiment showing the grill assembly of the cyclone dust-collecting apparatus of FIG. 3 in a cyclone body of a vacuum cleaner.

As shown in FIG. 4, grill body 110 may have an opening at both upper and lower ends. The upper opening may be connected to air-discharging passage 220 of cyclone body 200. The lower opening may be shielded by shielding member 130.

Shielding member 130 may be connected to bracket 111, which may be integrally formed with grill body 110, with screw 140. By removing screw 140, shielding member 130 may be separated from grill body 110, thus the grill assembly can be easily repaired and maintained.

Filth backflow-preventing portion 131 may be disposed at an outer circumference of shielding member 130. Filth backflow-preventing portion 131 may shift an advancing direction of filth in air flowing to grill body 110 to a whirling air current of cyclone body 200. Filth backflow-preventing portion 131 may include a plate downwardly extended from an end of an outer part of grill body 110 in a radial direction. The advancing direction of the filth may be shifted as the filth is hit against and reflected from the plate.

Figure 5:
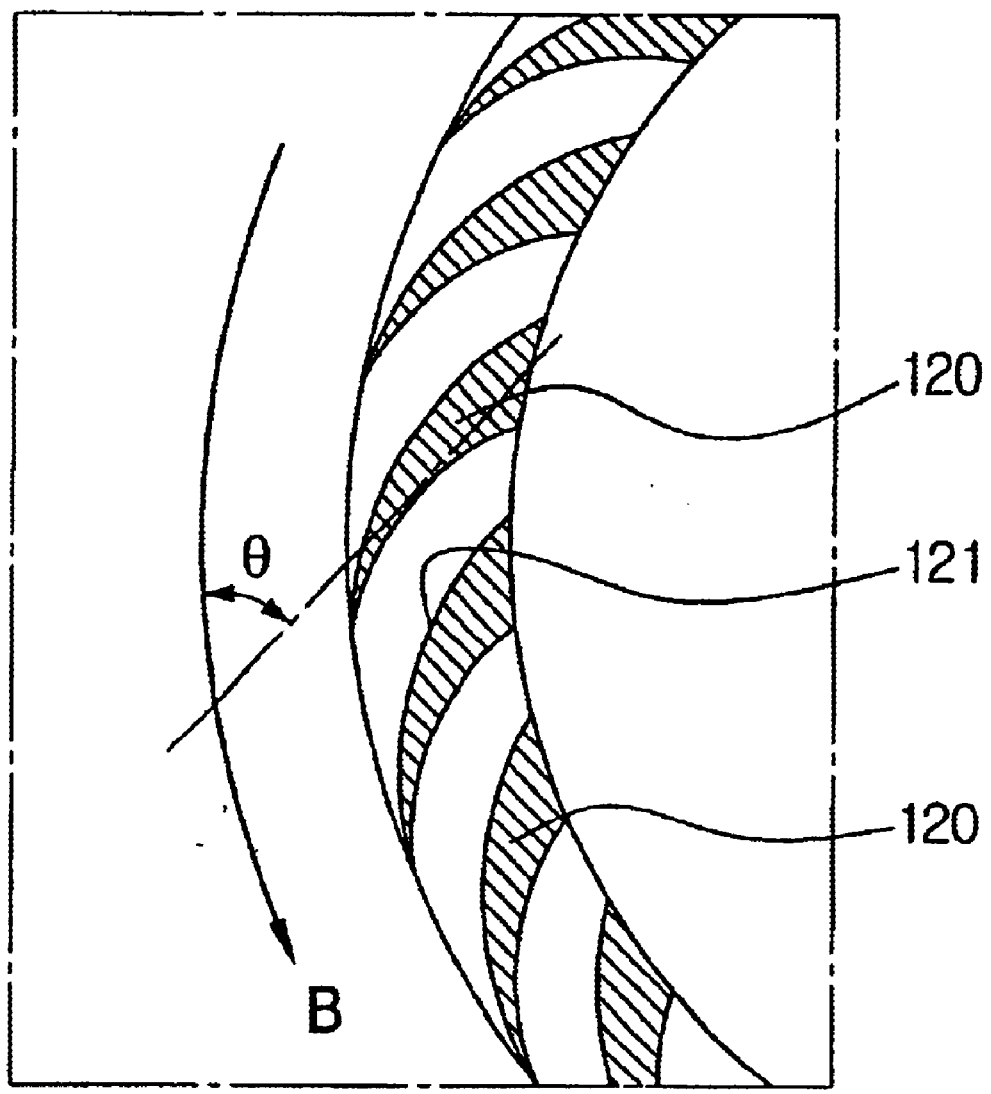
FIG. 5 is a partial sectional view of an embodiment showing the flow of air around the grill assembly of the cyclone dust-collecting apparatus of the vacuum cleaner.

A plurality of blades 120 may be disposed along an outer circumference of grill body 110 at a predetermined distance apart from each other so as to permit the air to pass therethrough. As shown in FIG. 5, passages 121 are formed between blades 120. A centerline of blades 120 and streamline B of the whirling air current may form acute angle θ. Likewise, an angle between passages 121 and the streamline B of the whirling air current may form an acute angle.

For the filth whirled in the air to enter passages 121 between blades 120, there may be a directional shift of more than about 90°. It may be very difficult for the filth to get through passages 121 since the filth may backflow against the whirling direction of the whirling air current.

The difficulty in filth entering passages 121 may become substantially more difficult when angle θ becomes substantially smaller and/or when the distance between blades 120 becomes substantially narrower. As such, the flow resistance of the air passing through passages 121 also increases. Consequently, noise from the vacuum cleaner may increase and the efficiency of the vacuum cleaner may decrease due to lowered suction power. Angle θ and the distance between blades 120 may be set accordingly. Angle θ and the distance between blades 120 may be determined within a range of about 10% to about 50% of overlapping shade between adjacent blades when the blades are projected onto an imaginary cylinder coaxial with blades 120.

FIG. 4 shows grill assembly 100 mounted on cyclone body 200. Grill assembly 100 may be removably connected to cyclone body 200 by a connection member, such as a screw (not shown). Protector 230 may prevent filth drawn with the air through air-suction passage 210 of cyclone body 200 from being directly drawn into passages 121 of grill assembly 100.

When the vacuum-generating device of the vacuum cleaner is operated, a whirling air current may be formed in cyclone body 200. Filth included in the whirling air current may be separated from the air current by centrifugal force, and the separated filth may be collected in filth-collecting portion 300, shown in FIG. 4.

Filth separated from the air current but uncollected in filth-collecting portion 300 may move to grill assembly 100 by an uprising air current whirling along the center of cyclone body 200. The filth in the air current may be reflected after hitting against filth backflow-preventing portion 131 of shielding member 130. The advancing direction of the filth may be shifted back to the whirling air current. Thus, the filth may be whirled again in the whirling air current.

Filth not reflected from the uprising air current by filth backflow-preventing portion 131 may flow to passages 121 of grill assembly 100. The air may be drawn into grill assembly 100 through passages 121 by a difference in pressure between the outside and the inside of grill assembly 100.

Passages 121 formed by a plurality of blades 120 may be disposed at acute angle θ with streamline B of the whirling air current. The filth may have greater inertia than the air due to having greater mass than the air. Therefore, for the filth whirled in the air current to enter passages 121 between blades 120, the filth may have to overcome the greater inertia and change its whirling direction more than about 90°.

In other words, the filth may have difficulty passing through passages 121, and thus, the amount of the filth flowing to the vacuum-generating device may decrease. Decreasing the amount of filth flowing to the vacuum-generating device may prevent the capability of dust-collecting of the vacuum cleaner from decreasing due to clogging of a filter, which may be disposed at an upper part of the vacuum-generating device.

As describe above, grill assembly 100 of the cyclone dust-collecting apparatus for the vacuum cleaner may decrease the amount of the filth flowing to the vacuum-generating device of the vacuum cleaner through the air-discharging passage of cyclone body 200. As such, the capability of dust-collecting of the vacuum cleaner may be improved.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A grill assembly of a cyclone dust-collecting apparatus for a vacuum cleaner, disposed at an inlet of an air-discharging passage of a cyclone body that generates a whirling air current from air drawn therein and separates filth from the air by centrifugal force of the whirling air current, the grill assembly comprising:
   a body; and
   a plurality of longitudinal passages formed in the body, each passage defined by adjacent blades,
      wherein the radial projection of a blade overlaps about 10% to about 50% of an adjacent blade surface area, wherein the blade overlap is determined when the blades are projected onto an imaginary cylinder coaxial with the blades; and
      wherein an extended centerline of the passages forms an acute angle with a streamline of the whirling air current.

2. The grill assembly of the cyclone dust-collecting apparatus of claim 1, further comprising a separate shielding member removably connected to the body.

3. The grill assembly of the cyclone dust-collecting apparatus of claim 1, further comprising a shielding member shaped and configured to deflect the direction of the filth in the air from flowing to the body so as to flow back into the whirling air current.

4. The grill assembly of the cyclone dust-collecting apparatus for the vacuum cleaner of claim 3, wherein the shielding member is shaped and configured as a convex plate facing downwardly in a direction away from the body.

5. A grill assembly of a cyclone dust-collecting apparatus for a vacuum cleaner, disposed at an inlet of an air-discharging passage of a cyclone body that generates a whirling air current from air drawn therein and separates filth from the air by centrifugal force of the whirling air current, the grill assembly comprising:

a body;

a plurality of blades disposed along an outer circumference of the body at a predetermined distance apart so as to define longitudinal passages between adjacent blades, wherein the radial projection of a blade overlaps about 10% to about 50% of an adjacent blade surface area, wherein the blade overlap is determined when the blades are projected onto an imaginary cylinder coaxial with the blades; and wherein an extended centerline of the blades forms an acute angle with a streamline of the whirling air current.

6. The grill assembly of the cyclone dust-collecting apparatus for the vacuum cleaner of claim 5, further comprising a shielding member removably connected to the body.

7. The grill assembly of the cyclone dust-collecting apparatus for the vacuum cleaner of claim 5, further comprising a shielding member shaped and configured deflect the direction of the filth in the air from flowing to the body so as to flow back into the whirling air current.

8. The grill assembly of the cyclone dust-collecting apparatus for the vacuum cleaner of claim 5, wherein the predetermined distance and the angle formed between the extended centerline of the blades and the streamline of the whirling air current are within a range of about 10% to about 50% of overlapping radial projections between adjacent blades when the blades are projected onto an imaginary cylinder coaxial with the blades.

9. The grill assembly of the cyclone dust-collecting apparatus for the vacuum cleaner of claim 5, wherein blades are formed so that the passages therebetween are convergent in the radially inward direction.

10. The grill assembly of the cyclone dust-collecting apparatus for the vacuum cleaner of claim 7, wherein the shielding member is shaped and configured as a convex plate facing downwardly in a direction away from the body.

* * * * *